US009386050B2

(12) United States Patent
Oswald

(10) Patent No.: US 9,386,050 B2
(45) Date of Patent: Jul. 5, 2016

(54) METHOD AND APPARATUS FOR FILTERING DEVICES WITHIN A SECURITY SOCIAL NETWORK

(71) Applicant: MOTOROLA SOLUTIONS, INC., Schaumburg, IL (US)

(72) Inventor: Gary J. Oswald, Elk Grove Village, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 535 days.

(21) Appl. No.: 13/826,672

(22) Filed: Mar. 14, 2013

(65) Prior Publication Data

US 2014/0280538 A1  Sep. 18, 2014

(51) Int. Cl.
G06F 15/16 (2006.01)
H04L 29/06 (2006.01)
G06Q 50/00 (2012.01)
G08B 13/196 (2006.01)

(52) U.S. Cl.
CPC .............. *H04L 65/403* (2013.01); *G06Q 50/01* (2013.01); *G08B 13/19621* (2013.01); *G08B 13/19697* (2013.01)

(58) Field of Classification Search
CPC . G08B 13/19621; H04L 65/403; G06Q 50/01
USPC .......................................................... 709/204
See application file for complete search history.

(56) References Cited

U.S. PATENT DOCUMENTS

| 6,879,570 | B1 | 4/2005 | Choi |
| 7,283,644 | B2 | 10/2007 | Dorai et al. |
| 7,495,687 | B2 | 2/2009 | Dumas |
| 7,746,380 | B2 | 6/2010 | Maruya |
| 7,782,363 | B2 | 8/2010 | Ortiz |
| 7,792,256 | B1 | 9/2010 | Arledge et al. |
| 8,111,282 | B2 | 2/2012 | Cutler |
| 8,131,118 | B1 * | 3/2012 | Jing ....................... G01C 21/20 382/305 |
| 8,284,254 | B2 | 10/2012 | Romanowich |
| 8,457,612 | B1 | 6/2013 | Daniell |
| 8,539,359 | B2 | 9/2013 | Rapaport et al. |
| 8,553,068 | B2 | 10/2013 | Taylor et al. |
| 8,626,210 | B2 | 1/2014 | Hicks, III |
| 8,675,059 | B2 * | 3/2014 | Johnson ............. G06K 9/00369 340/541 |
| 2006/0232673 | A1 | 10/2006 | Lipton et al. |
| 2009/0249460 | A1 | 10/2009 | Fitzgerald et al. |
| 2009/0251544 | A1 * | 10/2009 | Martin et al. ................. 348/155 |

(Continued)

FOREIGN PATENT DOCUMENTS

WO  2011063027 A3  9/2011

OTHER PUBLICATIONS

PCT International Search report mailed Nov. 17, 2014 counterpart to PCT/US2014/20110.

(Continued)

*Primary Examiner* — Tauqir Hussain

(57) ABSTRACT

A method and apparatus for choosing mobile telephones within a security social network is provided herein. Choosing mobile telephones may take place on a server side or a mobile telephone side. Even though mobile telephones lie within a particular area of interest, no image will be obtained/provided from the mobile telephone when a predetermined condition is met. This will greatly reduce an amount of images provided by mobile telephones along with reducing the possibility of an unwanted image being obtained.

13 Claims, 10 Drawing Sheets

(56) References Cited

U.S. PATENT DOCUMENTS

| | | |
|---|---|---|
| 2009/0262206 A1 | 10/2009 | Park |
| 2010/0118727 A1 | 5/2010 | Draves et al. |
| 2011/0046920 A1 | 2/2011 | Amis |
| 2011/0111728 A1 | 5/2011 | Ferguson et al. |
| 2011/0141276 A1 | 6/2011 | Borghei |
| 2012/0150966 A1* | 6/2012 | Fan et al. .................. 709/206 |
| 2012/0176239 A1* | 7/2012 | Preden ................. H04Q 9/00 340/539.17 |
| 2012/0183230 A1 | 7/2012 | Lopez et al. |
| 2012/0235790 A1 | 9/2012 | Zhao et al. |
| 2012/0268595 A1 | 10/2012 | Chou |
| 2013/0063615 A1 | 3/2013 | Takeuchi |
| 2013/0074120 A1 | 3/2013 | Adimatyam et al. |
| 2013/0108152 A1 | 5/2013 | Deng et al. |
| 2013/0212367 A1 | 8/2013 | Ingalls et al. |
| 2014/0279002 A1 | 9/2014 | Grigg et al. |
| 2014/0280756 A1 | 9/2014 | Maity et al. |
| 2015/0032876 A1 | 1/2015 | Staunton-Lambert |
| 2015/0127746 A1* | 5/2015 | Nyberg .................. G06F 9/544 709/205 |

OTHER PUBLICATIONS

Non-Final Office Action dated Aug. 25, 2014 in counterpart U.S. Appl. No. 13/827,764.

Office Action Dated Feb. 27, 2015 for Related U.S. Appl. No. 13/827,764.

Office Action Dated Apr. 10, 2015 for Related U.S. Appl. No. 13/827,503.

Office Action Dated Apr. 24, 2015 for Related U.S. Appl. No. 13/827,982.

Notice of Allowance Dated Aug. 14, 2015 for Related U.S. Appl. No. 13/827,982.

* cited by examiner

METHOD AND APPARATUS FOR FILTERING DEVICES WITHIN A SECURITY SOCIAL NETWORK

CROSS REFERENCE TO RELATED APPLICATIONS

The present application is related to co-pending U.S. application Ser. No. 13/827,764 entitled "Method and Apparatus for Filtering Devices Within a Security Social Network" filed on the same date as the present application. The present application is related to co-pending U.S. application Ser. No. 13/827,982 entitled "Method and Apparatus for Filtering Devices Within a Security Social Network" filed on the same date as the present application.

FIELD OF THE INVENTION

The present invention generally relates to security social networks, and more particularly to a method and apparatus for choosing devices within a security social network.

BACKGROUND OF THE INVENTION

A security social network allows registered members to participate in security operations by providing a centralized server with data on a particular event. Persons can register devices via, for example, a security social media web site. When an event occurs, registered members of the social network can be notified and registered devices in the area of the event will be instructed to acquire images of their surroundings. Mobile communication devices of members in the area can also run video recorders, audio recorders, microphones, or the like, while simultaneously collecting data from automated sensors. These devices are usually personally-owned, mobile devices such as cellular telephones. Devices may additionally be controlled in order to monitor, record, and/or transmit data. Collaboration of security social network members with private security agencies, law enforcement agencies, neighborhood watch groups, or the like, can provide comprehensive, timely, and effective security. Such a security social network is described in US Publication No. 2012/0150966, entitled "Security Social Network", and incorporated by reference herein.

A problem exists within security social networks in that many thousands of member devices may potentially be located near an event. Simply acquiring data from all member devices may overwhelm any system attempting to utilize the data. For example, assume a crime has been committed near a crowded venue such as a sports event. There may be thousands of devices that may return images, which can overwhelm any system attempting to utilize the images. In addition, the transmission of massive amounts of data may overwhelm any network handling the data.

Notwithstanding the above, the above-described security social network has no way for a device to prevent unwanted images or audio to be acquired. For example, if a security social network member is in a public washroom, or has a device in their pocket, it would be undesirable to have images acquired from their device.

Therefore a need exists for a method and apparatus for filtering devices within a security social network so that an enormous amount of data is not received and so that undesired images are not provided by member devices.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for choosing devices within a security social network are provided herein. Choosing devices may take place on a server side or a device side. During operation, even though devices lie within a particular area of interest, no image will be obtained/provided from any device when a predetermined condition is met. This will greatly reduce an amount of images provided by devices along with reducing the possibility of an unwanted image being obtained.

The predetermined conditions comprise conditions such as whether or not the member device is within a pocket or purse, whether or not an image taken with the member device matches a particular picture, scene, or description, whether or not a member device has a particular capability (e.g., image quality), or determining if a member device lies within an area of exclusion.

Figure 1:
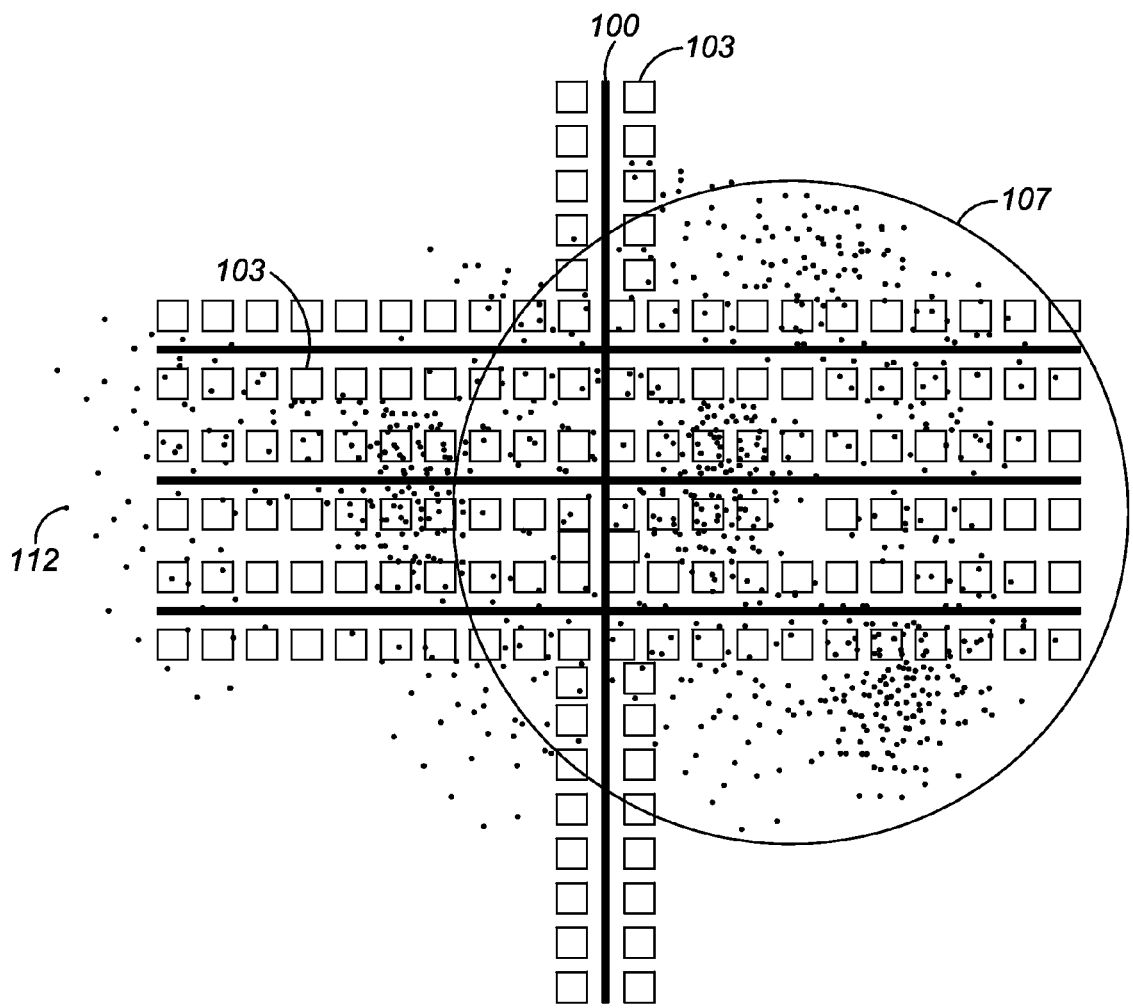
FIG. 1 is block diagram illustrating a general operational environment, according to one embodiment of the present invention.

Turning now to the drawings wherein like numerals designate like components, FIG. 1 is block diagram illustrating a general operational environment, according to one embodiment of the present invention. More particularly, FIG. 1 shows security social network member devices 112 (only one labeled) located throughout a geographical area. Streets 100 (only one labeled) are shown along with buildings 103 (only one labeled). During operation of a security social network, data may be requested from devices, for example, within a first region of interest 107. The region of interest, may be for example, centered on a crime. For sake of clarity, FIG. 1 shows many less member devices 112 than may actually exist within a particular area.

Figure 2:
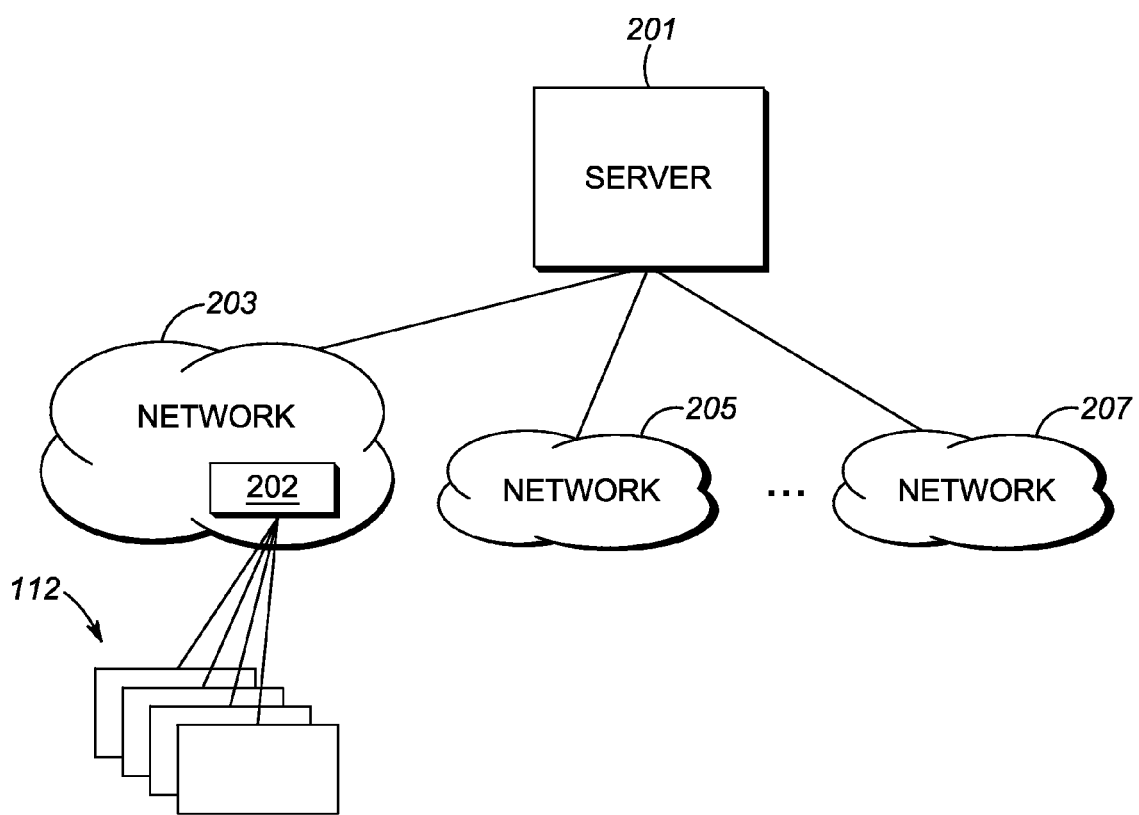
FIG. 2 is a more-detailed view of the general operational environment, according to one embodiment of the present invention.

FIG. 2 is a more-detailed view of the general operational environment, according to one embodiment of the present invention. As shown in FIG. 2 a plurality of networks 203-207 are in communication with security social network entity 201, referred to herein as a central server 201. Networks 203-207 may each comprise one of any number of over-the-air or wired networks, and may be distinctly different networks in terms of technology employed and network operators used. For example a first network 203 may comprise a private 802.11 network set up by a building operator, while a second network 205 may be a next-generation cellular communications network operated by a cellular service provider. Thus, network 205 may comprise a next-generation cellular communication system employing a 3GPP Long Term Evolution technology (LTE) system protocol, while network 203 may comprise an 802.11 communication system protocol. This multi-network, multi-access system can be realized with 3GPP's Internet Protocol (IP) Multimedia Subsystem (IMS) where central server 201 is an IMS Application Server.

Although only a single access point 202 is shown in system 200, each network 203-207 comprises at least one access point 202 utilized to give network access to multiple electronic devices. Each network device 112 is in communication with server 201 and continuously (or periodically) provides server 201 with information such as an identification of the electronic device 112, camera capabilities of the electronic device 112 (e.g. image resolution capability), a location of the electronic device 112, a "do not disturb" status of the electronic device 112, and other information that may be necessary to implement the techniques described below.

Figure 3:
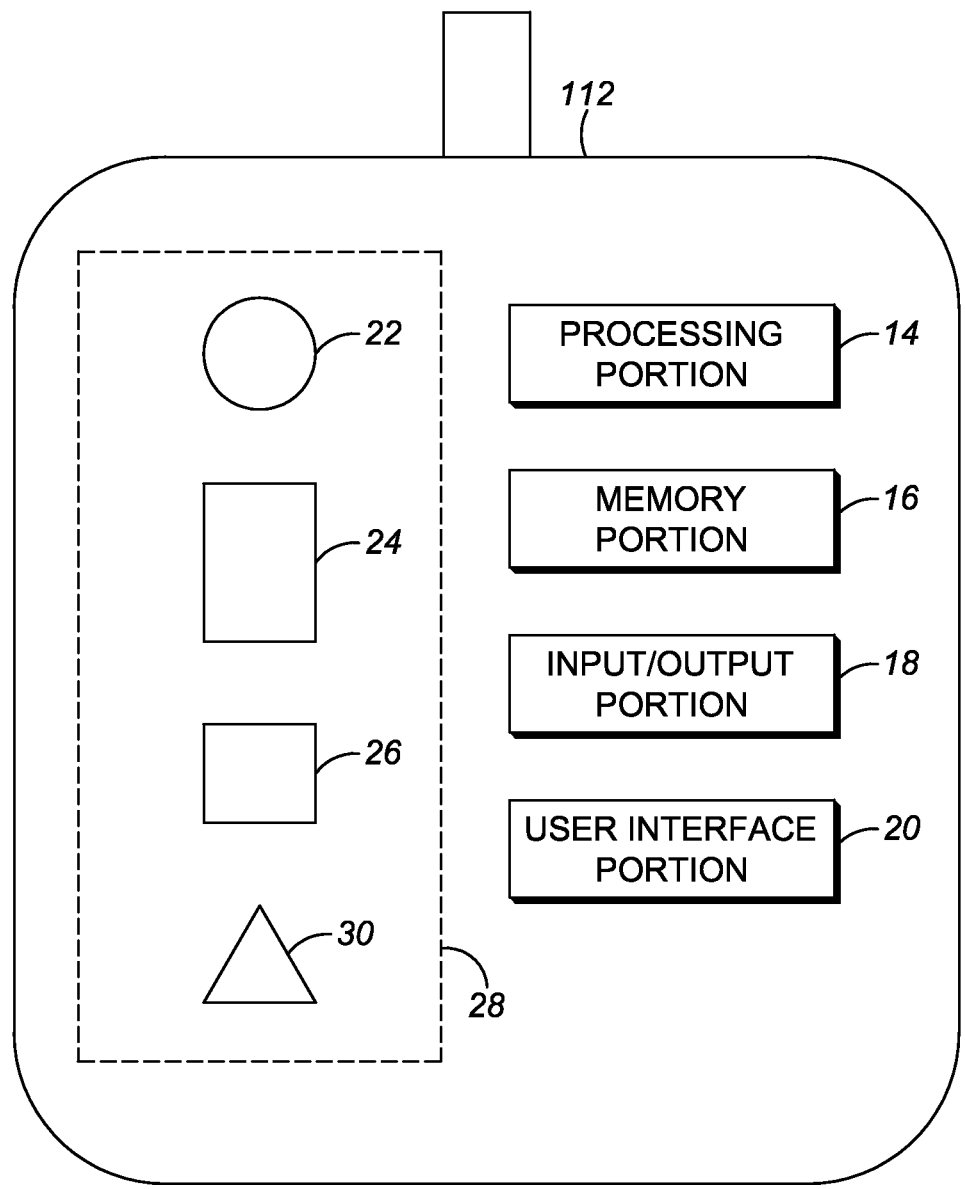
FIG. 3 is a block diagram of an example a wireless communications device of FIG. 1 that is configurable to be utilized with the security social network.

FIG. 3 is a block diagram of an example wireless communications device 112 that is configurable to be utilized with the security social network. Device 112 is configured to provide data (e.g., a photograph or video) upon receiving an instruction from server 201, or upon determining that a triggering event has occurred. Such a triggering event may comprise an environmental sensor being triggered. Thus, device 112 may provide an image to centralized server 201 when requested, or alternatively when a sensor is tripped on device 112. For example, if device 112 was equipped with a radiation sensor, device 112 may provide images upon the detection of radiation above a threshold and/or the radiation levels detected.

In an example configuration, wireless communications device 112 is a mobile wireless device such as a smartphone or mobile telephone. The communications device 112 can include any appropriate device, mechanism, software, and/or hardware for facilitating the security social network as described herein. As described herein, the communications device 112 comprises hardware or a combination of hardware and software. In an example configuration, the communications device 112 comprises a processing portion 14 such as a digital signal processor (DSP), general purpose microprocessor, a programmable logic device, or application specific integrated circuit (ASIC). Device 112 also comprises a memory portion 16, an input/output portion 18, a user interface (UI) portion 20, and a sensor portion 28 comprising at least one of a video camera portion 22. Various other sensors may be included, such as a force/wave sensor 24, a microphone 26, a radiation sensor/mobile Geiger Counter 30, or a combination thereof.

The force/wave sensor 24 comprises at least one of a motion detector, an accelerometer, an acoustic sensor, a tilt sensor, a pressure sensor, a temperature sensor, or the like. The motion detector is configured to detect motion occurring outside of the communications device, for example via disturbance of a standing wave, via electromagnetic and/or acoustic energy, or the like and may be used to trigger device 112 into taking an image. The accelerator is capable of sensing acceleration, motion, and/or movement of the communications device. The acoustic sensor is capable of sensing acoustic energy, such as a loud noise, for example. The tilt sensor is capable of detecting a tilt of the communications device. The pressure sensor is capable of sensing pressure against the communications device, such as from a shock wave caused by broken glass or the like. The temperature sensor is capable of sensing a measuring temperature, such as inside of the vehicle, room, building, or the like. The radiation sensor 30 is capable of measuring radiation, providing radiation readings that can be compared to radiation maps available. The processing portion 14, memory portion 16, input/output portion 18, user interface (UI) portion 20, video camera portion 22, force/wave sensor 24, microphone 26, and radiation sensor 30, are coupled together to allow communications there between (coupling not shown in FIG. 3). The communications device can comprise a timer (not depicted in FIG. 3).

In various embodiments, the input/output portion 18 comprises a standard smartphone transmitter and receiver as commonly known in the art. In a preferred embodiment of the present invention, portion 18 also comprises a standard GPS receiver. Thus, input/output portion 18 may be referred to as a transmitter 18, a receiver 18, or a GPS receiver 18 as it is envisioned to encompass all those components. The input/output portion 18 is capable of receiving and/or providing information pertaining to utilizing the security social network via the communications device 112 as described herein. The input/output portion 18 also is capable of peer-to-peer near field communications with other devices 112 and communications with the security social network server 201, as described herein. For example, the input/output portion 18 can include a wireless communications (e.g., 2.5G/3G/GPS/4G/IMS) SIM card. The input/output portion 18 is capable of receiving and/or sending video information, audio information, control information, image information, data, or any combination thereof to server 201. In an example embodiment, the input/output portion 18 is additionally capable of receiving and/or sending information to determine a location of the communications device 112. In an addition to a standard 802.11/Cellular receiver, the input\output portion 18 additionally comprises a GPS receiver (as discussed above).

In an example configuration, the communications device 112 can determine its own geographical location through any type of location determination system including, for example, the Global Positioning System (GPS), assisted GPS (A-GPS), time difference of arrival calculations, configured constant location (in the case of non-moving devices), any combination thereof, or any other appropriate means. In various configurations, the input/output portion 18 can receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof. In an example configuration, the input/output portion comprises a WIFI finder, a two way GPS chipset or equivalent, or the like.

The processing portion 14 is capable of facilitating the security social network via the communications device 112 as described herein. For example, the processing portion 14 is capable of, in conjunction with any other portion of the communications device 112, detecting a request for data received from server 201 or from another communication device 112 and responsive thereto providing a message to a security social network server or device, and determining whether or not to transmit data when requested by server 201, communication device 112, or any combination thereof. The processing portion 14, in conjunction with any other portion of the communications device 112, can provide the ability for users/subscribers to enable, disable, and configure various features of an application for utilizing the security social network as described herein. For example, a user, subscriber, parent, healthcare provider, law enforcement agent, of the like, can define configuration parameters such as, for example, an emergency contact list, voice/text/image/video options for an emergency call, threshold settings (e.g., sensor settings, timer settings, signature settings, etc.), to be utilized when sending a message to server 201 and/or other members and/or designated entities.

The processing portion 14 may also aide in determining if an image/video and/or sensor information should be transmitted to server 201 upon an instruction from server 201 to provide such an image/video and/or sensor information. In an alternate embodiment, processing portion 14 may determine if the image/video and/or sensor information should be transmitted to another device 112 to provide such an image/video and/or sensor information. The processing portion may also be provided by the user with an area of exclusion so that images are not obtained when the GPS receiver, for example, determines that the device is within an area of exclusion. The processing portion may also be provided by the server with image/picture so that any images obtained are not transmitted to the server when they do not match the image/picture. The processing portion may also be provided by the user or the server with a quality value so that any images are not transmitted to the server when the quality is below a certain threshold.

In a basic configuration, the communications device 112 can include at least one memory portion 16. The memory portion 16 can store any information utilized in conjunction with the security social network as described herein. For example, the memory portion 16 is capable of storing information pertaining to a location of a communications device 112, subscriber profile information, subscriber identification information, designated phone numbers to send video and audio information, an identification code (e.g., phone number) of the communications device, video information, audio information, control information, information indicative of signatures (e.g., raw individual sensor information, images, descriptions of objects to be imaged, a combination of sensor information, processed sensor information, etc.) of known types of triggering events, information indicative of signatures of known types of false alarms (known not to be a triggering event), an area of exclusion where no image will be provided if requested, or a combination thereof. The memory portion may also store threshold values and other pre-calibrated information that may be utilized as described below. Depending upon the exact configuration and type of processor, the memory portion 16 can be volatile (such as some types of RAM), non-volatile (such as ROM, flash memory, etc.). The communications device 112 can include additional storage (e.g., removable storage and/or non-removable storage) including, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or the like.

The communications device 112 also can contain a UI portion 20 allowing a user to communicate with the communications device 112. The UI portion 20 is capable of rendering any information utilized in conjunction the security social network as described herein. For example, the UI portion 20 can provide means for entering text, entering a phone number, rendering text, rendering images, rendering multimedia, rendering sound, rendering video, or the like, as described herein. The UI portion 20 can provide the ability to control the communications device 112, via, for example, buttons, soft keys, voice actuated controls, a touch screen, movement of the mobile communications device 112, visual cues (e.g., moving a hand in front of a camera on the mobile communications device 12), or the like. The UI portion 20 can provide visual information (e.g., via a display), audio information (e.g., via speaker), mechanically (e.g., via a vibrating mechanism), or a combination thereof. In various configurations, the UI portion 20 can comprise a display, a touch screen, a keyboard, a speaker, or any combination thereof. The UI portion 20 can comprise means for inputting biometric information, such as, for example, fingerprint information, retinal information, voice information, and/or facial characteristic information. The UI portion 20 can be utilized to enter an indication of the designated destination (e.g., the phone number, IP address, or the like).

In an example embodiment, the sensor portion 28 of the communications device 112 comprises the video camera portion 22, the force/wave sensor 24, the microphone 26, and radiation sensor 30. The video camera portion 22 comprises a camera and associated equipment capable of capturing still images and/or video and to provide the captured still images and/or video to other portions of the communications device 112. In an example embodiment, the force/wave sensor 24 comprises an accelerometer, a tilt sensor, an acoustic sensor capable of sensing acoustic energy, an optical sensor (e.g., infrared), or any combination thereof. A more in-depth description of server 201 and device 112, may be obtained from the above-described US Publication No. 2012/0150966.

During operation of server 201 may send a request for video/image data to be provided by any device 112 within an area surrounding an event. For example, if a bank robbery occurred at $5^{th}$ and Main Streets, server 201 may send a request for video/image data to be provided by all devices 112 within ½ mile of $5^{th}$ and Main Streets for a predetermined period of time (e.g., ½ hour). In doing so, server 201 may itself determine those devices within ½ mile of $5^{th}$ and Main Streets, or may simply send a general request to all devices for video/image data from devices within ½ mile of $5^{th}$ and Main Streets. The devices themselves may determine if they lie within ½ mile of $5^{th}$ and Main Streets. In an alternate embodiment, server 201 may instruct devices 112 to collect video/image data peer-to-peer from other near surrounding devices 112 which then do not receive the data request from server 201. In this embodiment, devices 112 instructed to collect video/image data peer-to-peer from other near surrounding devices 112, can analyze and remove duplicate or unwanted video/image data received from the other near surrounding devices 112 and thereby provide only relevant data to server 201.

Figure 4:
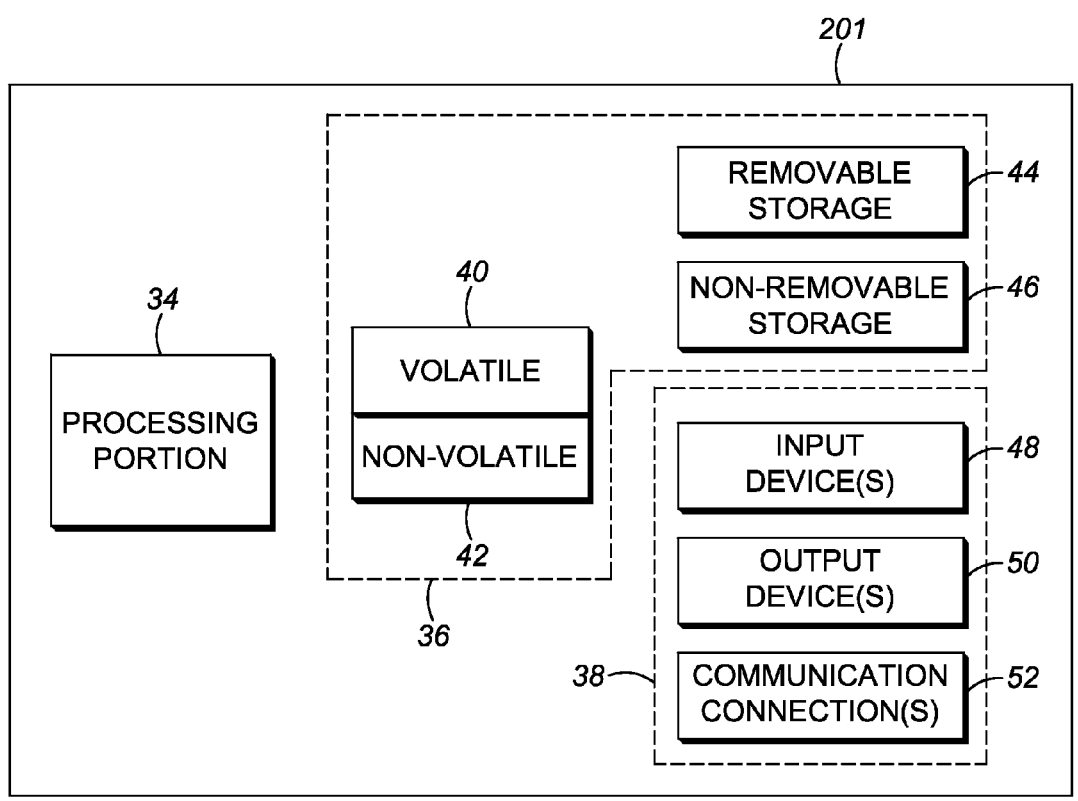
FIG. 4 a block diagram of an example security server.

FIG. 4 is a block diagram of a security server 201. Server 201 comprises hardware or a combination of hardware and software and may be located within any network device, such as access points or devices 112. Alternatively server 201 may comprise a stand-alone network entity. Server 201 can be implemented in a single processor or multiple processors (e.g., single server or multiple servers, single gateway or multiple gateways, etc.).

In an example configuration, the server 201 comprises a processing portion 34, a memory portion 36, and an input/output portion 38. The processing portion 34, memory portion 36, and input/output portion 38 are coupled together (coupling not shown in FIG. 4) to allow communications there between. The input/output portion 38 comprises an input device 48 and output device 50 which serves as a standard graphical user interface (GUI) capable of receiving and/or providing information to a user of server 201. The input/output portion 38 also comprises communication connection 52 that serves as a communication link to a network and ultimately to devices 112.

Returning back to FIG. 1, as is evident many thousands of devices 112 may potentially be located near an event. Simply acquiring data from all devices 112 may overwhelm any server 201 attempting to utilize the data as well as any network attempting to transmit the data. Therefore, it would be beneficial if server 201 and devices 112 could prevent or filter images being provided to server 201. In order to address this issue, server-side techniques and device-side techniques are provided to prevent or filter data provided to server 201. More particularly both server 201 and device 112 may take steps to reduce the amount of images transmitted to server 201.

For server-side filtering, server 201 may request images from only those devices with specific capabilities, or server 201 may provide a specific image to devices, requesting an image only when the image captured by device 112 matches the provided image. Server 201 may also request images only from devices 112 which have the capability of collecting and analyzing data directly peer-to-peer from other near surrounding devices 112 which then do not have to communicate directly with server 201. Server 201 chooses these devices 112 based on their relative location to other devices 112 and their ability to collect and analyze data from the other near surrounding devices 112. For device-side filtering, device 112 may provide an image only when the image is above a certain quality level (e.g., not in a pocket or purse), may provide an image only when outside an area of exclusion, or may only provide an image when the image matches a received image. Also devices 112 that are instructed to collect images peer-to-peer from other near surrounding devices 112, have the ability to filter out duplicate or unwanted images provided by the other near surrounding devices 112, thereby reducing the amount of images provided to server 201.

For server-side filtering based on device capabilities, server 201 will determine all devices within an area of interest and then access storage 46 to retrieve all device capabilities for devices 112 within a region of interest. Processing portion 34 will analyze device 112 capabilities and only request data from devices having specific capabilities and/or image detection properties. The request will be transmitted to the subset of devices within the area of interest via communication connection 52. For example, with thousands of devices 112 within a region of interest and available to potentially provide data, server 201 may request data from a subset of devices 112, for example, those having high-resolution cameras or those having the capability of collecting data peer-to-peer from other near surrounding devices 112 with high-resolution cameras. The determination as to what capabilities to choose may be based on how many devices having the desired capability exist within a predetermined area. Obviously, if only a few devices reside within an area of interest, those devices may be polled no matter what their capabilities are. However, with thousands of devices within a particular area, server 201 may request images from the best N (e.g., 500) devices. In this particular embodiment, the "best" devices may comprise those N devices having a best resolution for example.

For server 201 it is envisioned that processing portion 34 may determine (or be provided through input device 48) an area of interest. The processing portion may also determine or be provided with desired device capabilities, for example devices capable of providing hi-resolution images. Memory 40 or 42 may be accessed by processing portion 34 to determine those devices having the desired capabilities within the area of interest. Once the subset of the mobile devices within the area of interest are determined, images may be requested (via transmitter 52) and received (via receiver 52) from the subset. Similarly for devices 112 with the capability of collecting image data peer-to-peer from other near surrounding devices, it is envisioned that the processing portion 14 may determine (or be provided through input/output portion 18) an area of interest. The processing portion may also determine or be provided with desired device capabilities. Memory 16 may be accessed by processing portion 14 to determine those near surrounding devices having the desired capabilities within the area of interest. Once the subset of the mobile devices within the area of interest are determined, images may be requested and received (via input/output portion 18) from the subset, which are then processed and filtered by removing duplicate and unwanted images before providing the remaining relevant images to server 201.

During the above procedure, the desired quality may have to be increased or decreased accordingly in order to obtain a manageable number of images back from devices. For example, assume that there are a very high number of devices 112 in the area of interest that have the desired capability. For server 201, the processing portion 34 may modify the desired capability to increase or decrease the amount of images provided to server 201. For example, processor 34 may determine a number of devices within the subset of mobile devices (i.e., number of devices with the desired capability and within the area of interest). Processor 34 may modify the desired device capabilities when the number of devices is above or below a threshold. Similarly for devices 112 using input/output portion 14 to collect image data peer-to-peer from other near surrounding devices, the processing portion 14 may modify the desired capability to increase or decrease the amount of images received from the other near surrounding devices, before providing their images to server 201. The step of modifying may comprise lowering a quality of the desired device capabilities when the number of devices is below the threshold, or may comprise raising a quality of the desired device capabilities when the number of devices is above the threshold.

For server-side filtering based on scenes or images, server 201 may provide scenes or objects to devices 112. Devices 112 then locally determine if a match exists while capturing video or for video previously captured. This technique may be used, for example to provide a suspect description to devices 112 and then only receive data from devices where an image of the suspect has been captured. Similarly, an object such as a "blue pickup truck" may be provided to devices 112.

Devices 112 may determine locally whether or not a blue pickup truck is within a field of view of a camera. If not, no image will be provided back to server 201. With this in mind, processing portion 34 of server 201 may determine or be provided with an indication that an event has occurred, determining or be provided with an area of interest, determine devices within the area of interest, determining or be provided with a picture, scene, or description of an object, and use transmitter 52 to provide the picture, scene, or description of the object to the devices within the area of interest. Afterwards, receiver 52 may receive images of the scene or object from the devices within the area of interest only when the devices detect the provided picture, scene, or description of the object. These images may be stored in storage 40/42.

Similarly, processing portion 14 of devices 112 that collect image data peer-to-peer from other near surrounding devices, may determine or be provided with an indication that an event has occurred, determining or be provided with an area of interest, determine devices within the area of interest, determining or be provided with a picture, scene, or description of an object, and use input/output portion 18 to provide the picture, scene, or description of the object to the other near surrounding devices within the area of interest. Afterwards, input/output portion 18 may receive images of the scene or object from the other surrounding devices within the area of interest only when the devices detect the provided picture, scene, or description of the object. Processing portion 14 then filters duplicate and unwanted images before input/output portion 18 provides the remaining relevant images to server 201. The scene or object may comprise such things as a scene of a crime, automobile, particular person, or a description of a scene, description of an automobile, or a description of a particular person.

On the device side, in order to help reduce the amount of data provided to the server, devices 112 may detect when they exist within a pocket or purse based on, for example, an amount of ambient light present. No image will be taken if existing within a pocket or purse. In a similar manner, an image may be taken regardless, and processing portion 14 may determine a quality of the image. No image will be provided if the quality is below a threshold. Thus, in a first embodiment, an image will not be taken if the ambient conditions are below a threshold. In a second embodiment an image will be taken but not transmitted to server 201 if the quality of the image is low. Thus, the image will be transmitted by transmitter 18 when the quality is above a threshold, otherwise the image will not be provided. The quality may comprise things such as adequate ambient lighting, adequate resolution, adequately focused, etc.

For further device-side filtering, devices 112 may have preset locations (areas of exclusion) where image data will not be provided to server 201. For example, each device 112 may receive through user interface portion 20 various areas defined where they will not provide image/audio data to server 201. This area may, for example, comprise a residence of an owner of a device 112 so that when a user of the device is at home, no image data will be provided to server 201 when requested. Finally, a device may provide an image to server 201 only when outside an area of exclusion, even though device 112 lies within an area of interest as determined by server 201. Thus, receiver 18 may receive a request to provide an image, where the request is made to devices within a first geographic region. A GPS receiver 18 may determine a location for the device, and processing portion 14 may determine that the device lies within a second geographic region within the first geographic region. Transmitter 18 will provide the image when the device lies outside the second geographic region and fail to provide the image when the device lies inside the second geographic region.

As discussed above, even though multiple devices are within a particular area of interest, server 201 may request data from a subset of those devices having a particular capability or image property. Server 201 may perform one or more of the following:

Provide key scenes, objects, or descriptions of objects to the devices 112 which could locally determine if a match exists while capturing video or for video previously captured, images may then be received from only those devices where a match exists; and Analyze device capabilities and request data from only devices having for example, a particular sensor, a particular image resolution (e.g., 1024×768 pixel resolution), a particular shutter speed, a particular exposure time, an ability to zoom, sufficient battery power; devices capable of providing multiple views through multiple cameras, devices with anti-shake and blur detection/correction.

Instruct devices 112 to collect data peer-to-peer from other near surrounding devices 112 and filter out duplicate or unwanted data from those near surrounding devices 112 before providing only their remaining relevant data to server 201.

As discussed above, even though multiple devices are within a particular area of interest, devices 112 may perform one or more of the following in order to reduce an amount of data provided:

only provide images when an image matches a picture, scene, or description received from a server or any other device 112;

only provide images when a quality of the image is above a threshold. (e.g., outside of a pocket or purse); and only provide images when outside of a secondary area (e.g., outside a user's home) that is within the area of interest determined by server 201.

Communicate with and provide data peer-to-peer directly to devices 112 which collect and filter out duplicate or unwanted data before providing only the remaining relevant data to server 201.

Figure 5:
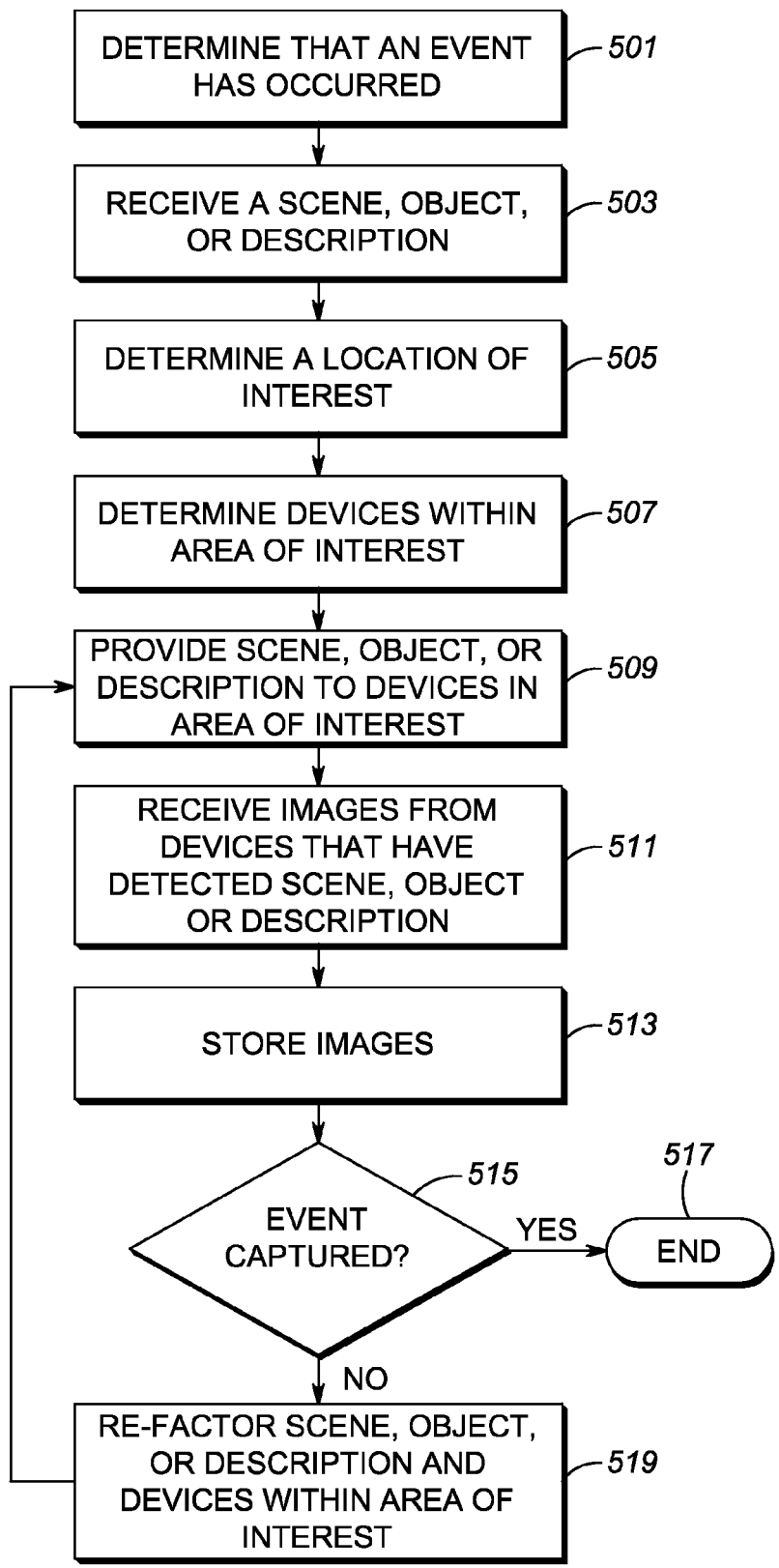
FIG. 5 is a flow chart showing operation of the server of FIG. 4 when providing key scenes or objects to devices 112.

FIG. 5 is a flow chart showing operation of server 201 when providing key scenes, objects, or descriptions of objects to devices 112. The logic flow begins at step 501 where processing portion 34 determines that an event has occurred. This determination may be from, for example, an alarm trigger being received from a device 112 through communication connection 52, or may simply be received by a user of server 201 through input device 48.

Regardless of how the determination is made that an event has occurred, once the event has occurred, processing portion 34 receives a picture, scene, or description of object(s) (step 503). This may be received via input device 48 with a user simply imputing the picture, scene, or description of object(s), or alternatively may be received via communication connection 52 via a network or non-network entity. The step of determining a picture, scene, or description of an object may comprise the step of determining a scene of a crime, automobile, particular person, or a description of a scene, description of an automobile, or a description of a particular person The logic flow then continues to step 505 where a location of interest is determined by processing portion 34. The location of interest may simply be received by processing portion 34 via a user inputting the location of interest via input device 48.

Once the event, object, and region of interest have been determined by processing portion 34, the logic flow continues to step 507 where processing portion accesses storage 46 to determine devices 112 within the region of interest. Processing portion 34 will then utilize communications connection 52 (and in particular a transmitter) to provide the picture, scene, or description of object(s) to all devices 112 within the region of interest (step 509) along with a request for an image/video. In response, processing portion 34 receives (via communication connection 52, and preferably a receiver) images from devices 112 that have detected the provided picture, scene, or description of object(s) (step 511). These images are then stored in storage 46 (step 513). At step 515 processing portion 34 determines whether the event is still occurring in real-time, has been sufficiently captured, and if additional data captures are needed by analyzing the stored images received so-far and/or by other means such as information received from input device 48 or communication connection 52, If no additional captures are needed, the logic flow ends at step 517. Otherwise, the logic flow continues to step 519 where the scene, object, description, and devices within the area of interest are re-evaluated and re-determined by processing portion 34. The processing then loops back to step 509 and continues providing the system with the opportunity to obtain more relevant data captures of the event.

As an example of the above logic flow, assume that an event "Bank Robbery" was received by server 201 along with a region of interest (½ mile surrounding $5^{th}$ and Mane), and a description of a "blue pickup truck" used as a getaway vehicle. Server 201 will then determine devices 112 within ½ mile surrounding $5^{th}$ and Mane, provide these devices with a description "blue pickup truck", and request images from the devices. Server 201 will then receive images only from devices that have imaged a "blue pickup truck".

Figure 6:
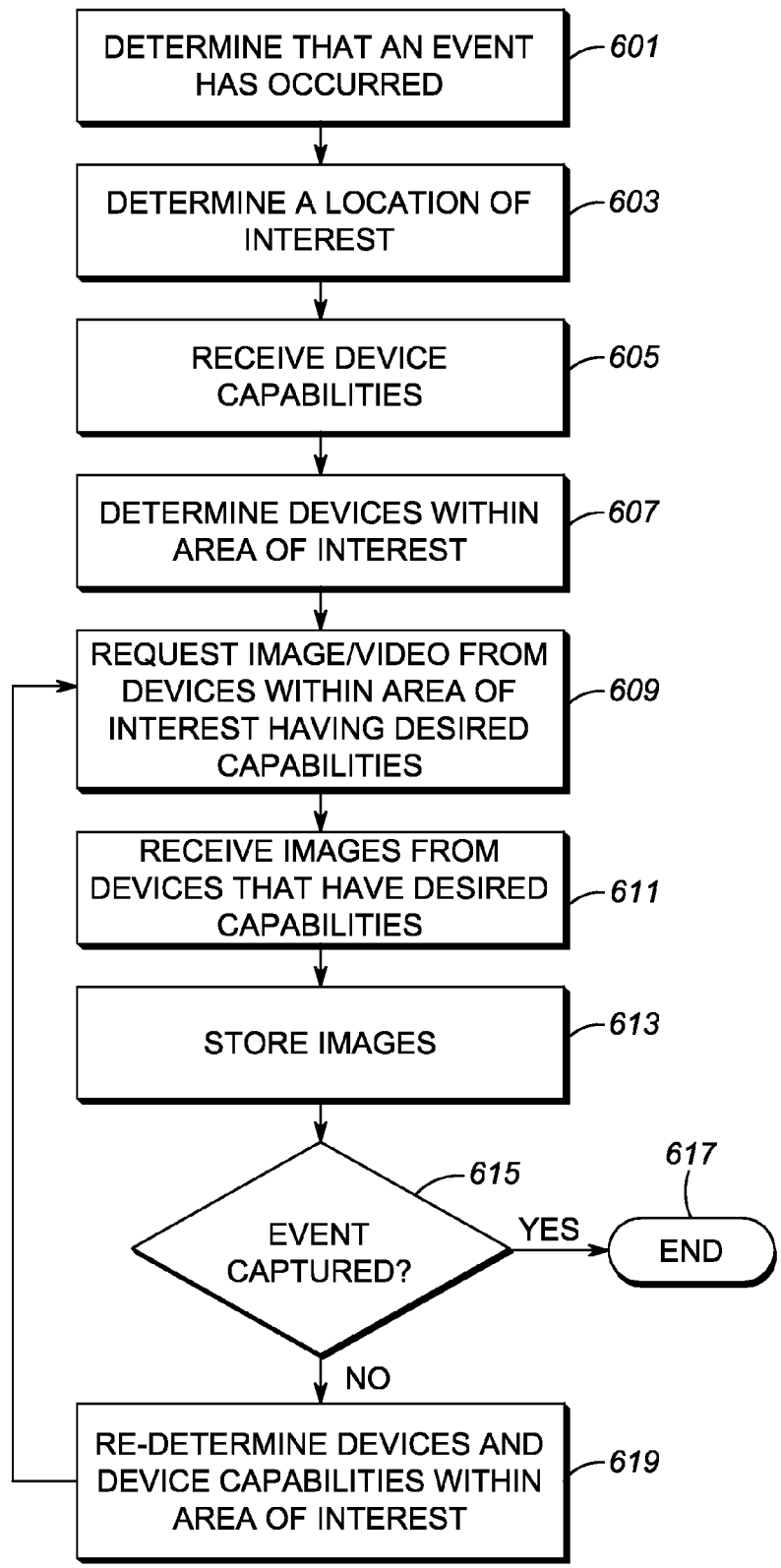
FIG. 6 is a flow chart showing operation of the server of FIG. 4 when requesting data from devices having certain image capabilities.

FIG. 6 is a flow chart showing operation of server 201 when requesting data from devices 112 having certain image capabilities. The logic flow begins at step 601 where processing portion 34 determines that an event (e.g., a crime) has occurred. This determination may be from, for example, an alarm trigger being received from a device 112 through communication connection 52, or may simply be received by a user of server 201 through input device 48.

Regardless of how the determination is made that an event has occurred, once the event has occurred, the logic flow then continues to step 603 where a location of interest is determined by processing portion 34. The location of interest preferably an area of interest surrounding the crime. The location of interest may simply be received by processing portion 34 via a user inputting the location of interest via input device 48.

At step 605 processing portion receives a "device capabilities" request from input device 48. This may simply be a request, for example, of images from all cameras having a predetermined capability (as discussed above). In alternate embodiments of the present invention the desired device capability may comprise a desired camera resolution, a desired shutter speed, a desired exposure time, an ability to zoom, sufficient battery power; devices capable of providing multiple views through multiple cameras, and/or devices with anti-shake and blur detection/correction. At step 607 processing portion 34 accesses storage 46 to determine devices 112 within the region of interest having the requested device capabilities.

Processing portion 34 will then utilize communications connection 52 to request an image/video from devices within the region of interest having the desired capabilities (step 609). In response, processing portion 34 receives (via communication connection 52) images from devices 112 that have the requested capabilities (step 611). These images are then stored in storage 46 (step 613). At step 615 processing portion 34 determines whether the event is still occurring in real-time, has been sufficiently captured, and if additional data captures are needed by analyzing the stored images received so-far and/or by other means such as information received from input device 48 or communication connection 52, If no additional captures are needed, the logic flow ends at step 617. Otherwise, the logic flow continues to step 619 where the scene, object, description, devices, and device capabilities within the area of interest are re-evaluated and re-determined by processing portion 34. The processing then loops back to step 609 and continues providing the system with the opportunity to obtain more relevant data captures of the event. It should be noted that typically a transmitter (potentially wireless) existing within communications connection 52 will be used to transmit a request for images to devices 112, while a receiver (potentially wireless) existing within communications connection 52 will be used to receive images from devices 112.

As an example of the above logic flow, assume that an event has occurred in a baseball stadium with thousands of devices 112. Server 201 may request images from those devices within the stadium that have a particular camera resolution.

Figure 7:
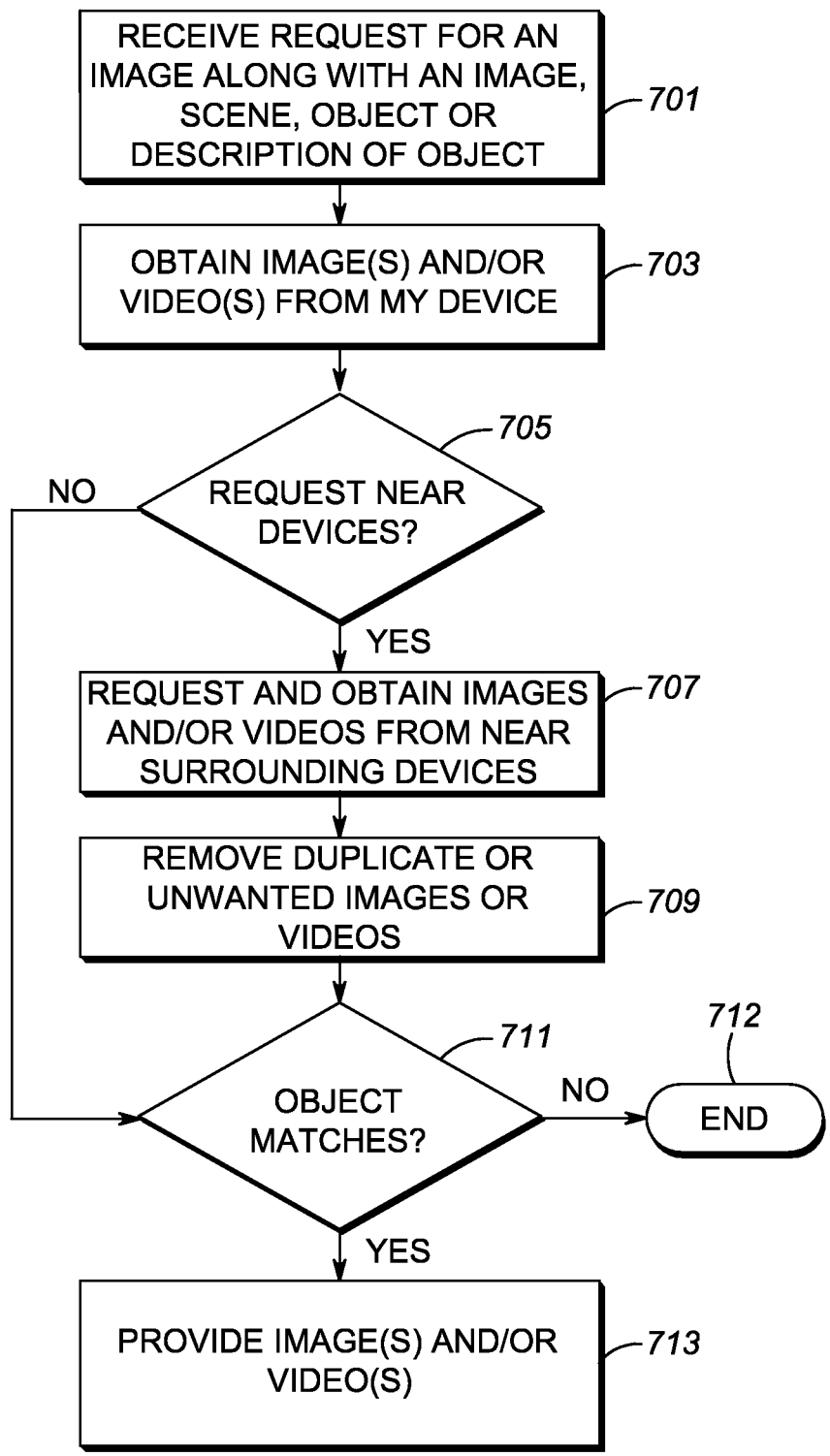
FIG. 7 is a flow chart showing operation of a device of FIG. 3 when only providing data to a server when an image matches a scene or description.

FIG. 7 is a flow chart showing operation of a device 112 when only providing data to a server when an image matches a picture, scene, or description of an object. The logic flow begins at step 701 where input/output portion 18 receives a request for an image along with a description of a picture, scene, or description of an object. In response at step 703 an image/video is obtained through camera 22. Step 705 then determines whether the request received at step 701 also included requesting images from near surrounding devices 112. If not, logic flow continues to step 711. Otherwise, logic flow continues with step 707 where image data is requested and received peer-to-peer from other near surrounding devices 112 and step 709 where duplicate or unwanted image data is filtered out. Standard processing software stored in memory portion 16 is then executed to determine if the images/videos captured matches a picture, scene, or description of an object (step 711). Step 711 may be as simple or as complex as video analytic software stored in memory 16 will allow. If so, the logic flow continues to step 713 where processing portion utilizes input/output portion to send the image/video to server 201, otherwise the logic flow simply ends at step 712. The above process may be repeated multiple times as requested by server 201.

Figure 8:
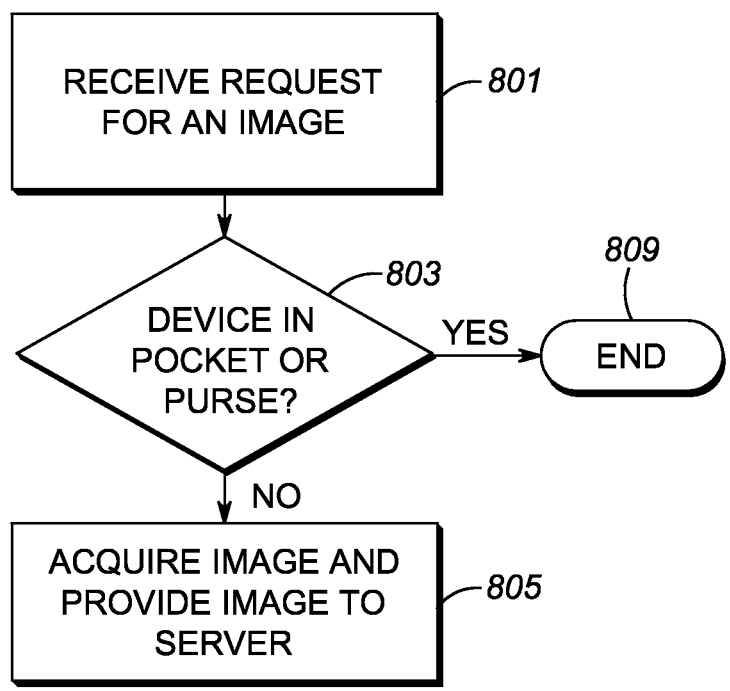
FIG. 8 is a flow chart showing operation of a device of FIG. 3 providing images to the server when outside of a pocket or purse.

FIG. 8 is a flow chart showing operation of a device 112 providing images to the server when outside of a pocket or purse. The determination of whether or not a device is outside a pocket or a purse may be made in the following fashion:

Use motion sensor 24 to detect motion. If no motion is detected it can be assumed that device 112 is stored, potentially within a pocket or purse;

Use camera 22 to detect an amount of ambient light. If very little ambient light is detected it can be assumed that device 112 is stored, potentially within a pocket or purse.

The logic flow begins at step 801 where input/output portion 18 receives a request for an image. In response at step 803 processing portion 14 determines if device 112 is within a pocket or purse. If so, the logic flow continues to step 805 where processing portion acquires an image/video and utilizes input/output portion to send the image/video to server 201, otherwise the logic flow simply ends at step 809.

Figure 9:
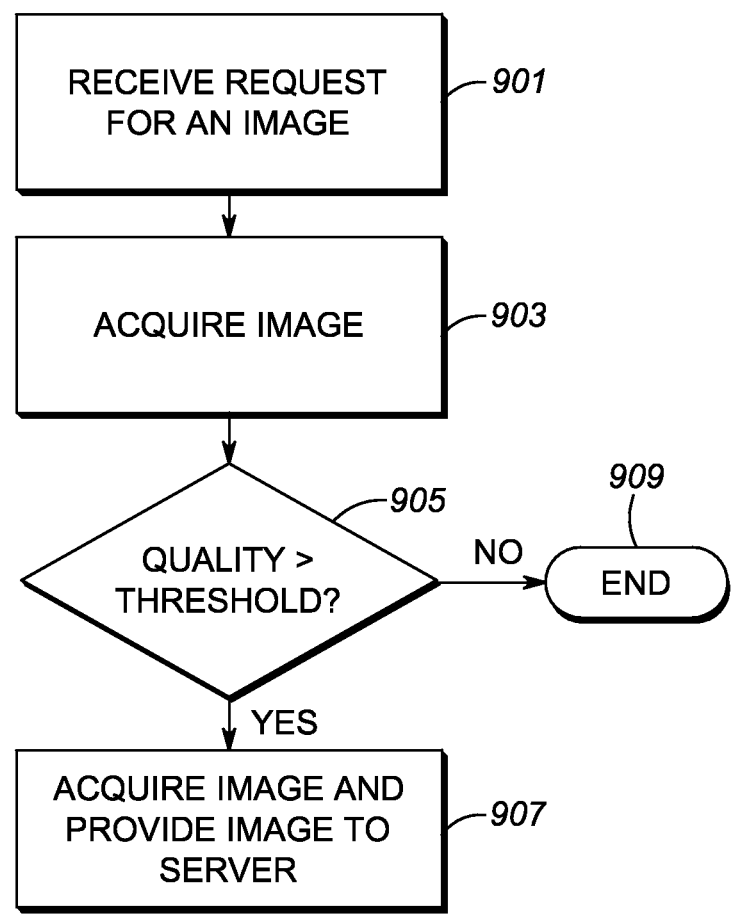
FIG. 9 is a flow chart showing operation of a device of FIG. 3 providing images to the server only when the quality of the image is above a threshold.

The above logic flow had no image being taken when certain ambient conditions were present. In an alternate embodiment of the present invention an image may be taken and yet not transmitted to server 201 when the image quality is below a threshold. For example, if the image is blurry, or too dark, the image may not be transmitted to server 201. FIG. 9 is a flow chart showing operation of a device of FIG. 3 providing images to the server only when the quality of the image is above a threshold. The logic flow begins at step 901 where receiver 18 receivers a request to provide an image of surroundings. At step 903 camera 22 acquires the image of the surroundings. At step 905 processor 14 then determines a quality of the image and whether or not the quality is above a threshold. If so, the logic flow continues to step 907 where the image is provided to server 201, otherwise the logic flow ends at step 909.

As discussed above, the step of determining the quality may comprise the step of determining if the image has enough lighting, has enough resolution, is in focus, or any other metric used to measure image quality.

Figure 10:
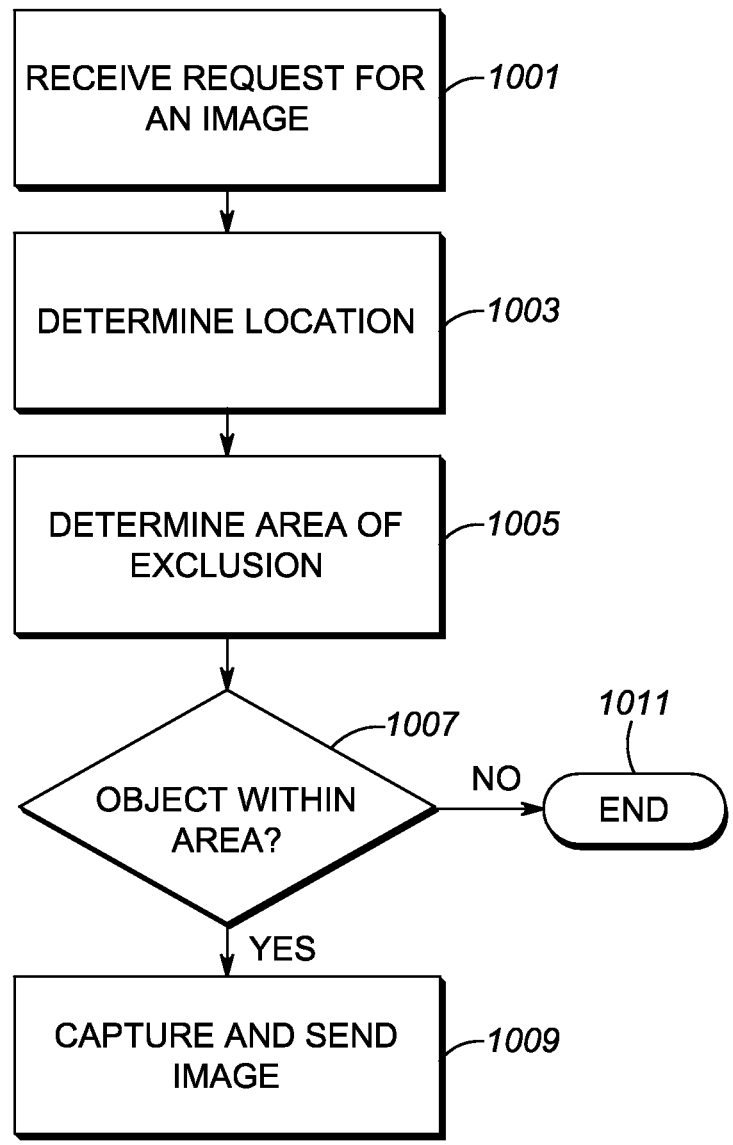
FIG. 10 is a flow chart showing operation of a device of FIG. 3 when only providing images to the server when outside of a secondary area that is within an area of server interest.

FIG. 10 is a flow chart showing operation of a device 112 when only providing images to the server when outside of a secondary area that is within an area of server interest. For example, a user of device 112 may decide that they do not want any images taken when inside their residence. An area of exclusion may be defined by the user that includes their residence. Thus, even within a primary area of interest as determined by server 201, no image will be provided if device 112 is within an area of exclusion. These areas of exclusion may be received via user interface portion and stored in memory 16. In an alternate embodiment a "do not disturb" message may be transmitted to server 201 by device 112 when within an area of exclusion.

The logic flow begins at step 1001 where input/output portion 18 receives a request for an image. The request may have been made by server 201 because device 112 was within a first area of interest. In response at step 1003 processor accesses input/output portion (which preferably includes a GPS receiver) to determine a current location. At step 1005 processing portion 14 accesses memory portion 16 to determine all areas of exclusion (e.g., at least a second area within the area of interest). At step 1007 processing portion determines whether or not device 112 is within an area of exclusion and if so, the logic flow continues to step 1009 where processing portion captures an image/video with camera 22 and utilizes input/output portion to send the image/video to server 201, otherwise the logic flow simply ends at step 1011.

As described above, in an alternate embodiment of the present invention processing portion will utilize input/output portion to send a "do not disturb" message whenever device 112 is determined to be within the area of exclusion.

In the foregoing specification, specific embodiments have been described. However, one of ordinary skill in the art appreciates that various modifications and changes can be made without departing from the scope of the invention as set forth in the claims below. For example, although the description above was given with multiple embodiments, one of ordinary skill in the art may recognize that these embodiments may be combined in any way. For example a member device may attempt to match a scene with a provided image along with determining if the member device is within a pocket or purse. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus for filtering devices within a security social network, the apparatus comprises the steps of:
   a microprocessor determining that an event has occurred, determining an area of interest, determining devices within the area of interest, and determining a picture, scene, or description of an object;
   a transmitter providing the picture, scene, or description of the object to the devices within the area of interest through a communication network; and
   a receiver receiving images of the scene or object from the devices within the area of interest through the communication network only when the devices detect the provided picture, scene, or description of the object;
   wherein determining the picture, scene, or description of the object comprises determining a scene of a crime, automobile, particular person, or a description of a scene, description of an automobile, or a description of a particular person.

2. The apparatus of claim 1 further comprising:
   storage storing the images received from the devices.

3. The apparatus of claim 1 wherein determining that the event has occurred comprises determining that a crime has occurred.

4. The apparatus of claim 1 wherein determining the area of interest comprises determining a location of interest surrounding the event that has occurred.

5. The apparatus of claim 1 wherein determining devices within the area of interest comprises determining devices having a particular capability that are within the area of interest.

6. An apparatus comprising the steps of:
   a network receiver receiving by a mobile device, a request for an image or video, and a picture, scene, or description of an object;
   a camera obtaining the image or video;
   a processor determining if the image or video matches the picture, scene, or description of the object;
   a network transmitter providing the image or video to a centralized server when the image or video matches the picture, scene or description of the object; and
   wherein the processor discards the image or video when the image or video does not match the picture, scene or description of the object;
   wherein determining the picture, scene, or description of the object comprises determining a scene of a crime, automobile, particular person, or a description of a scene, description of an automobile, or a description of a particular person.

7. The apparatus of claim 6 wherein the received picture, scene, or description of the object is received from a mobile device.

8. The apparatus of claim 6 wherein the received picture, scene, or description of an object is received from a centralized server.

9. The apparatus of claim 6 wherein the mobile device is within an area of interest as determined by the centralized server.

10. An apparatus comprising:
    a processor determining that an event has occurred, an area of interest, devices within the area of interest, a picture, scene, or description of an object;
    a network transmitter providing the picture, scene, or description of the object to the devices within the area of interest; and
    a network receiver receiving images of the scene or object from the devices within the area of interest only when the devices detect the provided picture, scene, or description of the object;
    wherein determining the picture, scene, or description of the object comprises determining a scene of a crime, automobile, particular person, or a description of a scene, description of an automobile, or a description of a particular person.

11. The apparatus of claim 10 further comprising:
    storage storing the images received from the devices.

12. The apparatus of claim 10 wherein the event comprises a crime.

13. The apparatus of claim 12 wherein the area of interest comprises a location surrounding a crime.

* * * * *